(12) United States Patent
Sponsler

(10) Patent No.: US 8,708,104 B1
(45) Date of Patent: Apr. 29, 2014

(54) ROTATABLE TREE STAND

(76) Inventor: Harry R. Sponsler, Elkhart, TX (US)

( * ) Notice: Subject to any disclaimer, the term of this patent is extended or adjusted under 35 U.S.C. 154(b) by 0 days.

(21) Appl. No.: 13/559,675

(22) Filed: Jul. 27, 2012

(51) Int. Cl.
A01M 31/02 (2006.01)

(52) U.S. Cl.
CPC .................................... A01M 31/02 (2013.01)
USPC ............ 182/187; 182/133; 182/136; 182/188

(58) Field of Classification Search
USPC .................. 182/133, 134, 135, 136, 187, 188
See application file for complete search history.

(56) References Cited

U.S. PATENT DOCUMENTS

| 2,775,489 | A | * | 12/1956 | Hagadorn | 182/129 |
|---|---|---|---|---|---|
| 3,353,629 | A | * | 11/1967 | Brunes | 182/20 |
| 3,358,789 | A | * | 12/1967 | Laun | 182/113 |
| RE36,276 | E | * | 8/1999 | Smith | 182/187 |
| 6,367,585 | B1 | * | 4/2002 | Fast | 182/187 |
| 6,386,321 | B1 | * | 5/2002 | Muhich | 182/187 |
| 6,722,472 | B2 | * | 4/2004 | Berkbuegler | 182/187 |
| 2011/0297481 | A1 | * | 12/2011 | Copus | 182/113 |
| 2011/0308887 | A1 | * | 12/2011 | Johnson | 182/187 |
| 2012/0175190 | A1 | * | 7/2012 | Schlipf | 182/187 |
| 2012/0199418 | A1 | * | 8/2012 | Priest | 182/129 |

* cited by examiner

Primary Examiner — Alvin Chin Shue
Assistant Examiner — Colleen M Chavchavadze

(57) ABSTRACT

The present invention is a 180° rotatable tree stand that has an embodiment that allows the tree stand to be manually manipulated to control the rotation. Another embodiment has the rotation operated and controlled by electric motors and controls in the seat. Another embodiment allows the user to use a remote control to manipulate the seat. The seat will rotate 360°. The tree stand is secure to the tree by a hanger and a cable and pulley system manipulate the rotation and leveling both forward and back ward. It also allows for adjustment from side to side to perfectly level the platform.

6 Claims, 7 Drawing Sheets

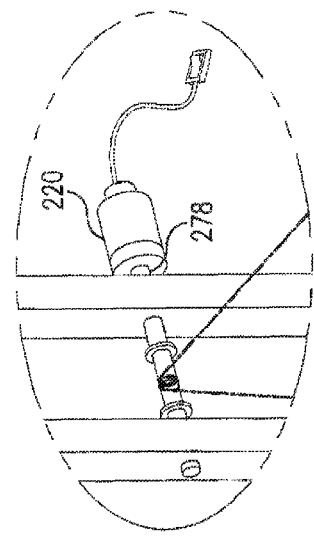
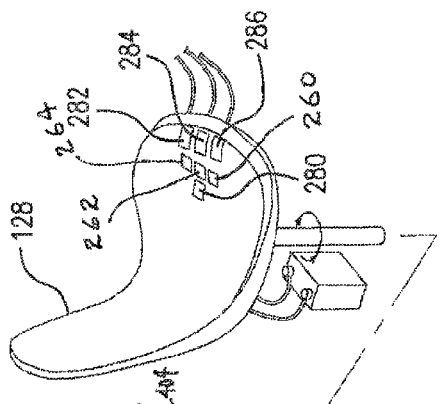
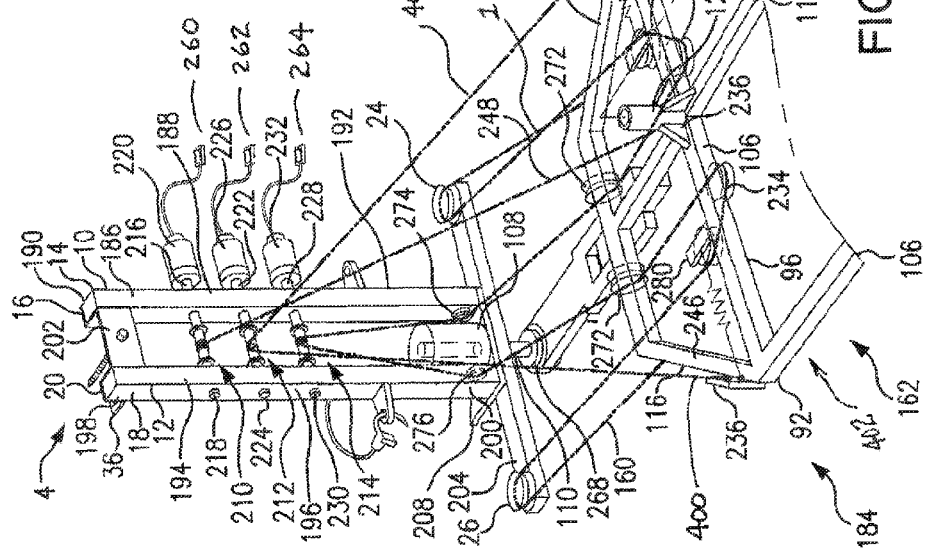
FIG. 7
FIG. 6

ROTATABLE TREE STAND

BACKGROUND OF THE INVENTION

The present invention is a rotatable tree stand that has multiple embodiments one of which includes a pulley system and handle to manipulate the tree stand platform in a 180° of rotation. Another embodiment includes electric motors to perform the 180° movement of the tree stand. It also includes switches to control the rotational movement and leveling in a front to back and side to side direction.

The applicant is unaware of any prior art.

THE INVENTION

The present invention is a rotatable tree stand. The tree stand comprises in combination, a tree hanger. The tree hanger has a near end and a distal end. The tree hanger has two spaced-apart adjacent vertical posts. Each of the posts has a back and each post has a side surfaces. The distal end of the tree hanger has a horizontal bar fixedly mounted thereon. Each end of the horizontal bar has mounted thereon, a rotatable pulley.

The tree hanger has a first support plate fixedly attached to the back of both posts and near the near end. The first support plate has an opening therethrough. The tree hanger has a second support plate fixedly attached to the back of both posts and near the distal ends. The second support plate has a set of tree spikes fixedly attached thereto. The tree hanger has a hanger support bracket on each post side surface and the spaced-apart post has an opening therethrough.

There is a vertical barrel hinge. This vertical barrel hinge is comprised of a vertical round shaft that has a near end and a distal end. The vertical round shaft has a sleeve covering each of the near end and the distal end. The vertical, round shaft is supported by the sleeves and freely rotatable in the sleeves.

The vertical round shaft has a tubular rod fixedly attached on the front surface. The tubular rod has a near end and a side. The tubular rod has a first shackle attached thereto, near the near end.

There is a flat rectangular safety brace that has a near end and a distal end and an opening near the near end with an opening near the distal end. The brace is attached to the side of the tubular rod by a detachable fastening means or pin through the opening near the near end. There is also a horizontal barrel hinge fixedly attached to the distal end of the tubular rod. The horizontal barrel hinge is fixedly attached to a platform at a rear end of the platform.

The platform has a size to support a person and has a tubular framework surmounted by a covering. The platform has cross member supports. The cross member supports support a first housing. The first housing has supported therein a first vertical rotatable shaft. This first vertical rotatable shaft has a near end and a distal end. The near end has fixedly surmounted thereon, a handle, and the distal end has fixedly attached thereto, a drive pulley. The platform has a second housing fixedly attached to a cross member. The second housing contains a second support post that is surmounted on the second support post with a seat support assembly. The second support post is freely rotatable in the second housing. There is a seat mounted on the seat support assembly. The second housing has a distal end and fixedly attached to the second housing at the distal end, a second shackle. The turn buckle assembly has a near end and a distal end. The near end attached to the second shackle by a detachable fastening means and the distal end is detachedly fastened to the first shackle by a detachable fastening means.

There is mounted under the platform cross members, two spaced-apart tensioning assemblies. Each of the tensioning assembly comprised of a swingable arm that has a near end and a distal end. The near end is rotatably attached to a cross member and the distal end has mounted thereon a rotatable pulley. Each of the distal ends has a tension spring attached thereto. The opposite end of the tension spring is attached to a cross member distant from the cross member on which the swingable arm is attached.

There is also a single cable that is fixedly attached to a rear cross member. The cable extends on the outside of a first pulley on the horizontal bar. The cable also extends around the outside of a first tension pulley and around the outside of the drive pulley. Then it continues around the outside of the other tension pulley, around the outside of the second pulley mounted on the horizontal bar. The cable is fixedly attached to a rear platform cross member.

BRIEF DESCRIPTION OF THE DRAWINGS

FIG. 1a shows the top portion of the tree hanger.

FIG. 6 shows another embodiment the electrically driven cable and pulley system.

FIG. 7 shows the expanded view of a motor, drive shaft and the first roller.

DETAILED DESCRIPTION OF THE DRAWINGS

Figure 1:
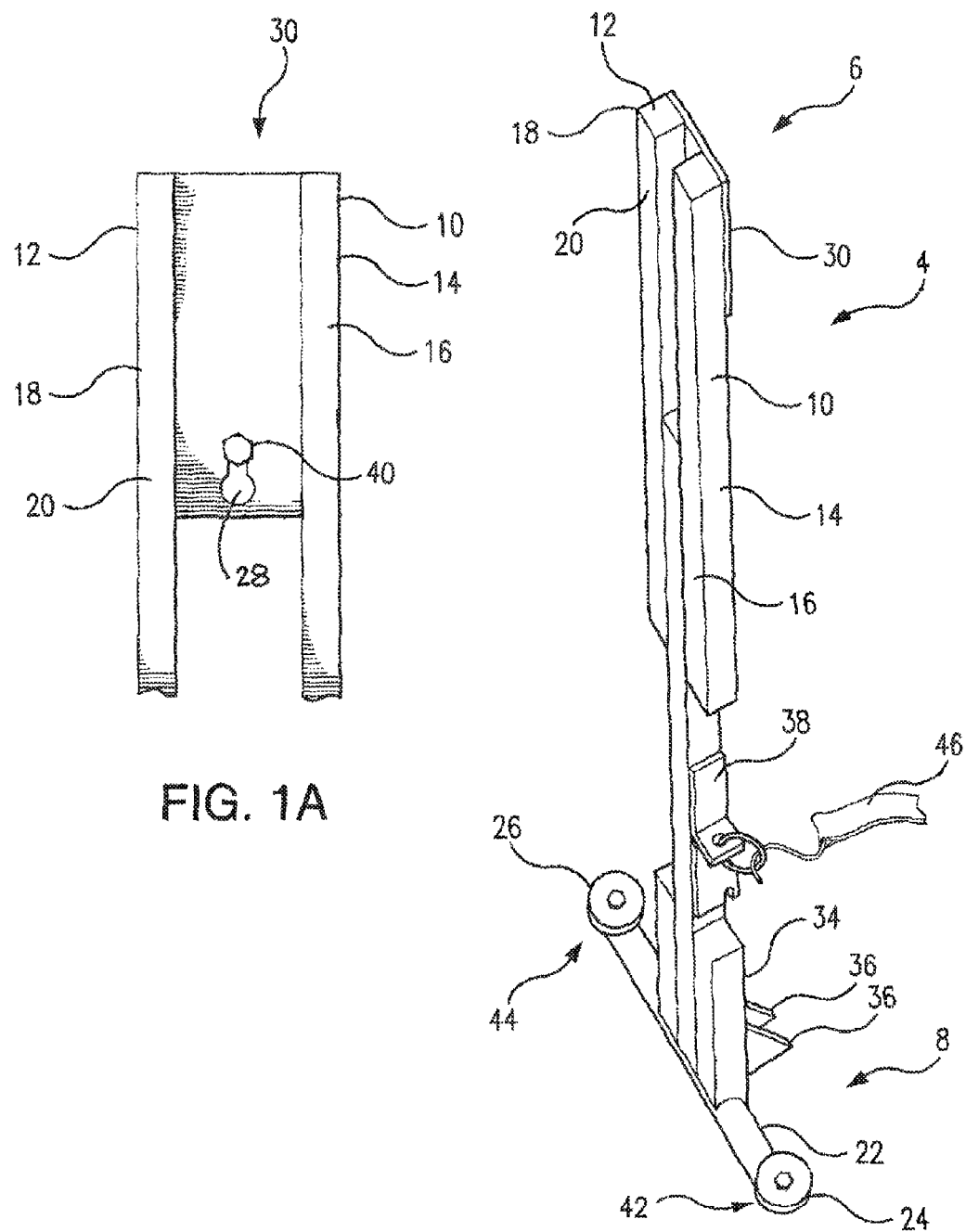
FIG. 1 shows the tree hanger.
Figure 2:
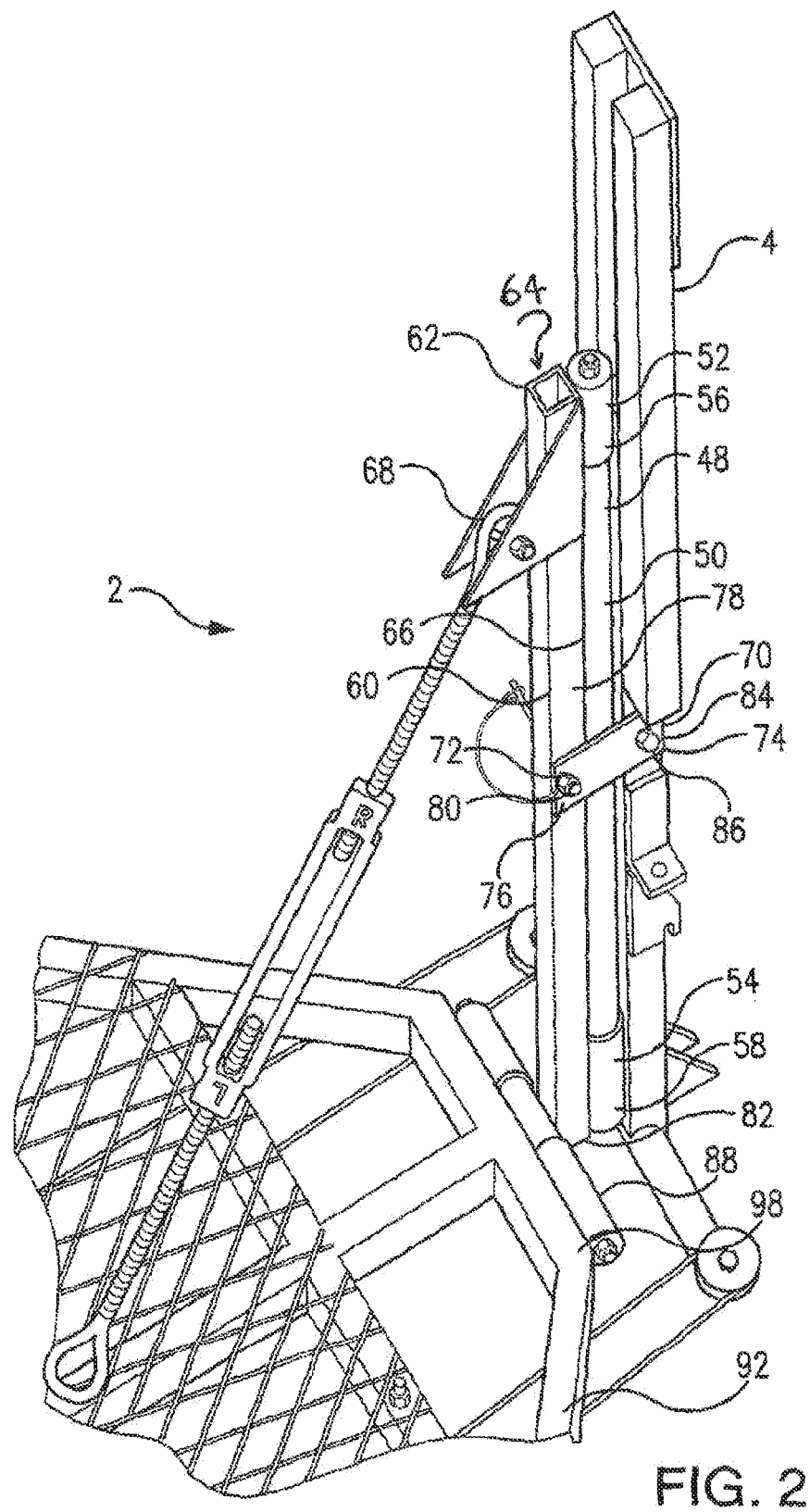
FIG. 2 shows the tree stand attached to the tree hanger.

FIG. 1 shows the tree hanger 4 of the present invention, The tree hanger 4 is designed to support the rotatable tree stand 2 (shown in FIG. 2). The tree hanger 4 is first attached to a tree that the hunter has selected to hunt from. The tree hanger 4 is secured to the tree via lags or other fasteners 40 (not shown). The tree hanger 4 consists of near end 6 and a distal end 8. There is a pair of vertical post 10 and 12 on opposing sides of the hanger 4. The first vertical post 10 has a side 14 and a back 16. The second vertical post 12 also has side 18 and a back 20. At the distal end 8 of the tree hanger 4 is a horizontal bar 22. This horizontal bar 22 has a right end 42 and a left end 44. At each end of the horizontal bar 22 is a pulley 24 and 26. The first pulley 24 is mounted on the right end 42 of the horizontal bar 22. On the left end 44 of the horizontal bar 22 is a second pulley 26. Near the near end 6 of the tree hanger 4 is a first support plate 30. This support plate 30 has an opening therethrough 28 (shown in FIG. 1a) for attachment of the lags 40 for the purpose of securing the tree hanger 4 to a tree.

FIG. 1a shows the first support plate 30 in greater detail. Near the distal end 8 of the tree hanger 4 is a second support plate 34 (FIG. 1). Surmounted on this second support plate 34 is a set of tree spikes 36 (FIG. 1) that prevent the tree hanger 4 from slipping down the tree when the rotatable tree stand 2 is in use. Also mounted on the tree hanger 4 is a hanger support bracket 38 (FIG. 1) that has a ratchet type strap 46 (FIG. 1) attached thereto that is tightened around the tree to help secure the tree hanger 4 to the tree. Support bracket 38 is identical on both sides of the tree hanger 4 with the ratchet strap 46 spanning between it and then tightened. FIG. 1a also shows the first support plate 30 from the back. The opening 28 is clear and shows bow the support plate 30 is capable of accepting a lag 40.

FIG. 2 shows the rotatable tree stand 2 attached to the tree hanger 4. There is a vertical barrel hinge 48. This vertical barrel hinge 48 is comprised of a vertical round shaft 50 that has a near end 52 and a distal end 54. The vertical round shaft 50 has a sleeve 56 and 58 covering each of the near end 52 and the distal end 54 respectively. The vertical round shaft 50 is supported by the sleeves 56 and 58 and freely rotatable within the sleeves 56 and 58.

The vertical round shaft 50 has a tubular rod 60 fixedly attached on the front surface 66. The tubular rod 60 has a near end 62 and a side 64. The tubular rod 60 has a first shackle 68 attached thereto, near the near end 62.

There is a flat rectangular safety brace 70 that has a near end 72 and a distal end 74 and an opening 76 near the near end 72 with an opening 84 near the distal 74. The safety brace 70 is attached to the side 78 of the tubular rod 60 by a detachable fastening means or pin 80 through the opening 76 near the near end 72. The opening 84 is secured by a fastener 86.

There is also a horizontal barrel hinge 88 fixedly attached to the distal end 82 of the tubular rod 60. The horizontal barrel hinge 88 is fixedly attached to the platform 92 at a rear end 98 of the platform 92.

Figure 3:
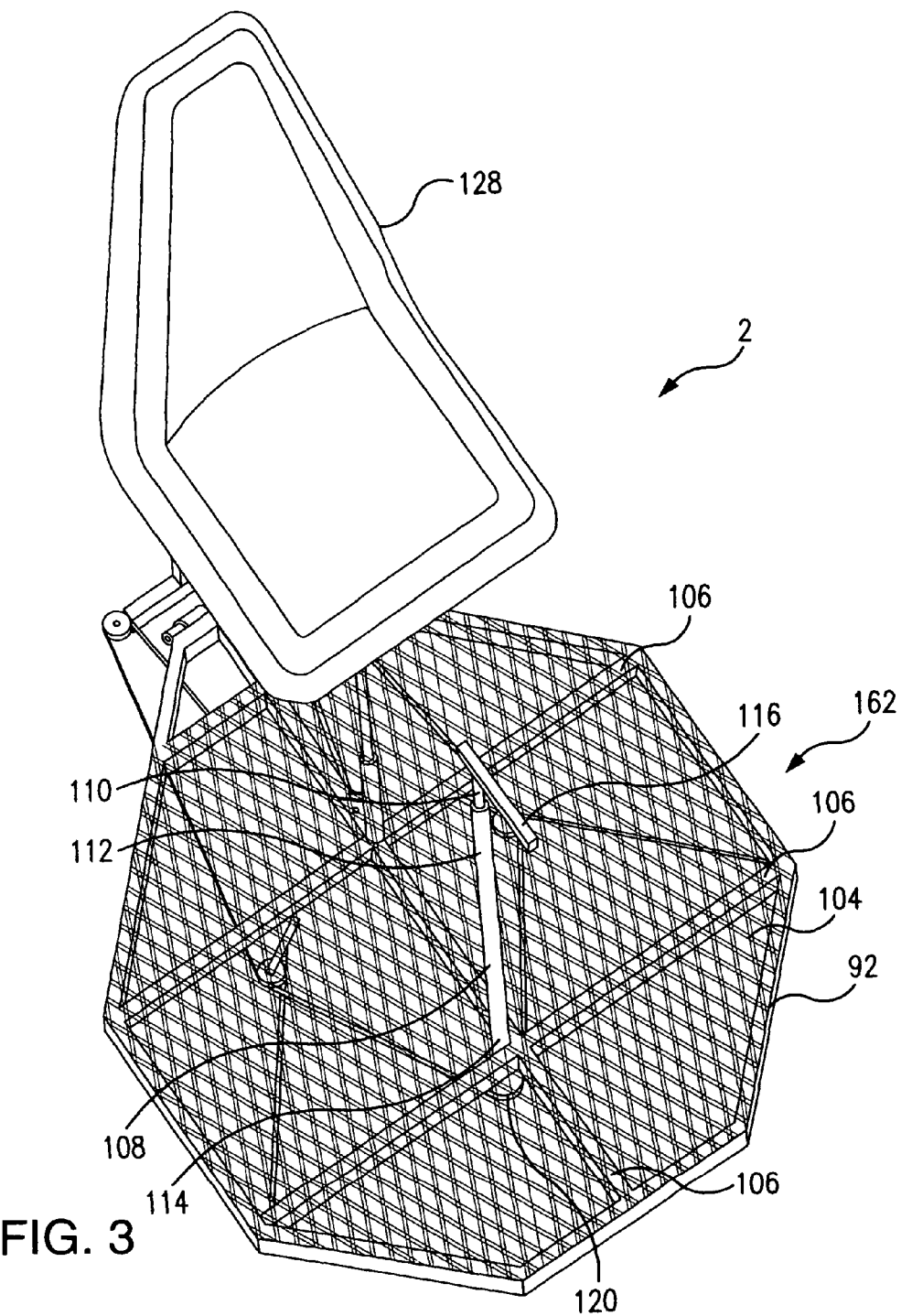
FIG. 3 shows the tree stand from the top.

FIG. 3 shows the rotatable tree stand 2 from the top. The platform 92 has a size to support a person and has a tubular framework 162 surmounted by a covering 104. The platform 92 has cross member supports 106. The cross member supports 106 support a first housing 108. The first housing 108 has supported therein a first vertical rotatable shaft 110. This first vertical rotatable shaft 110 has a near end 112 and a distal end 114. The near end 112 has fixedly surmounted thereon, a handle 116, and the distal end 114 has fixedly attached thereto, a drive pulley 120. Also shown is seat 128.

Figure 4:
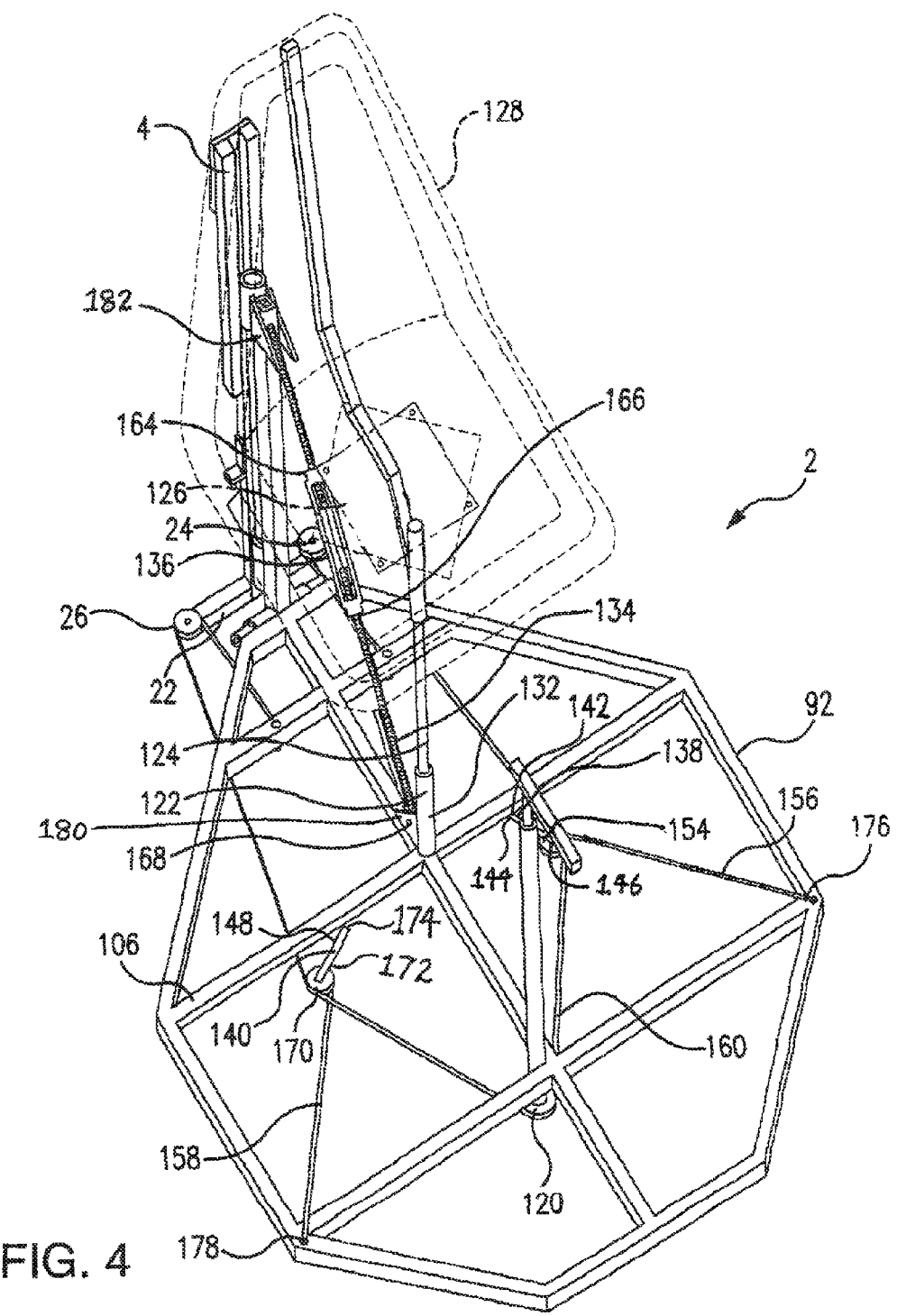
FIG. 4 shows the tree stand from the top without the seat and floor covering.

FIG. 4 shows the rotatable tree stand 2 from the top without the floor or covering 104 and the seat 128 in phantom. The platform 92 has a second housing 122 fixedly attached to a cross member 106. The second housing 122 contains a second support post 124 that is surmounted on the second housing 122 with a seat support assembly 126. The second support post 124 is freely rotatable in the second housing 122. There is a seat 128 mounted on the seat support assembly 126. The second housing 122 has a distal end 132 and fixedly attached to the second housing 122 at the distal end 132 is a second shackle 134. The turn buckle assembly 136 has a near end 164 and a distal end 166. The near end 164 is attached to the second shackle 134 by a detachable fastening means 168 and the distal end 166 is detachedly fastened to the first shackle 68 by a detachable fastening means 168 attached to the first shackle bracket 180.

There is mounted under the platform cross members 106, two spaced-apart tensioning assemblies 138 and 140. Each of the tensioning assembly 138 and 140 comprised of a first swingable arm 142 that has a near end 144 and a distal end 146. The near end 144 is rotatably attached to a cross member 106 and the distal end 146 has mounted thereon a rotatable pulley 154. The second swingable arm 148 has a near end 172 is rotatably attached to a cross member 106 and the distal end 174 has mounted thereon a rotatable pulley 170. Each of the distal ends 146 and 152 has a tension spring 156 and 158 attached thereto. The opposite ends 176 and 178 of the tension spring 156 and 158 is attached to a cross member 106 distant from the cross member 106 on which the swingable arms 142 and 148 is attached.

There is also a single cable 160 that is fixedly attached to a rear cross member 106. The cable 160 extends on the outside of a first pulley 24 on the horizontal bar 22. The cable 160 also extends around the outside of a first tension pulley 154 and around the outside of the drive pulley 120. Then it continues around the outside of the other tension pulley 170, around the outside of the second pulley 26 mounted on the horizontal bar 22. The cable 160 is fixedly attached to the rear 98 of platform 92 cross member 106.

Figure 5:
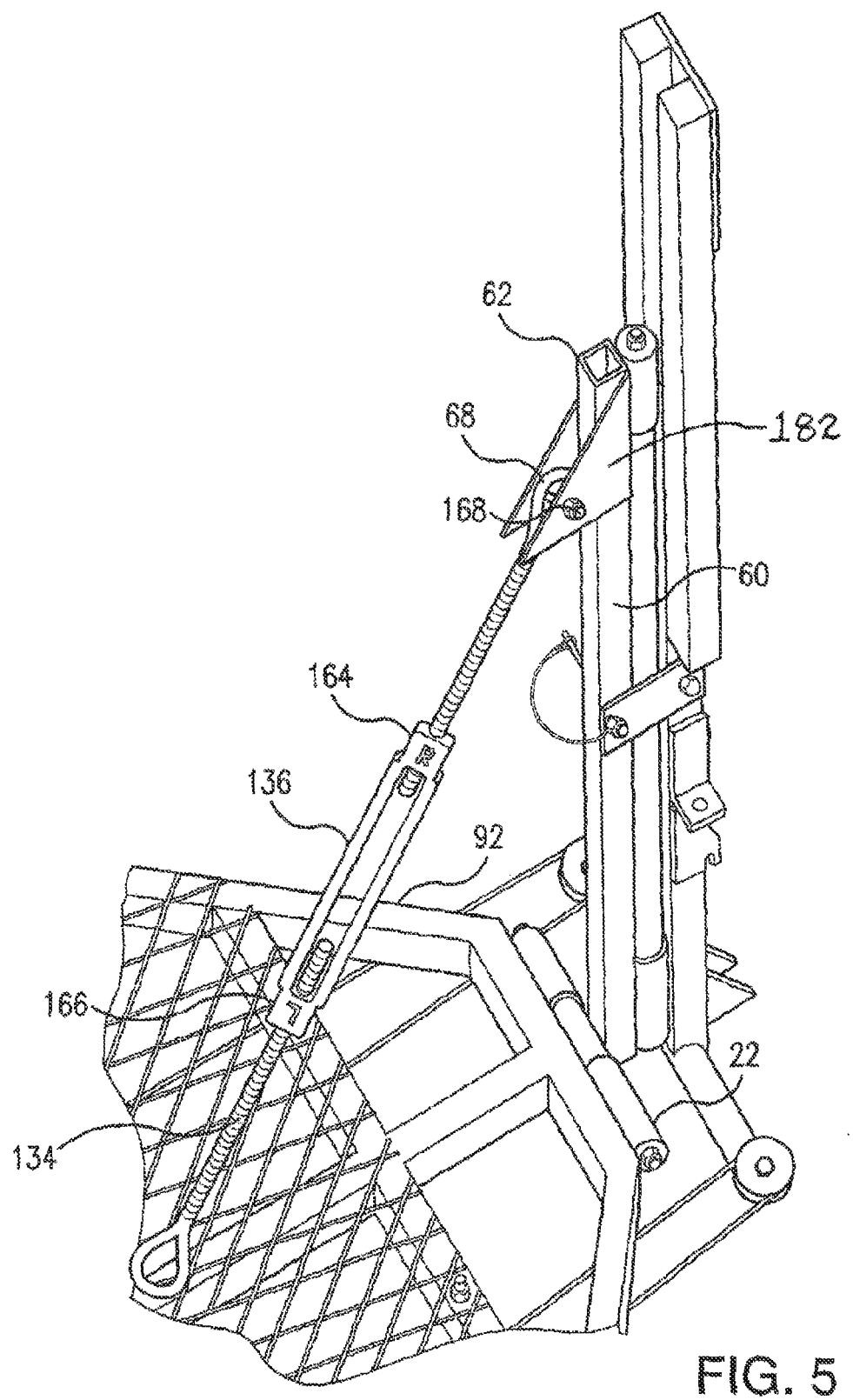
FIG. 5 shows the horizontal barrel hinge of the tree stand and the shackle/turn buckle relationship.

FIG. 5 shows the horizontal barrel hinge 22 of the tree stand 2 and the shackle/turn buckle relationship. The tubular rod 60 near its near end 62 has the first shackle bracket 180, first shackle 68 and the detachable fastening means or pin 168. Also shown is the turn buckle 136 and its threaded connection to the first shackle at the turn buckles near end 164. The distal end 166 of the turn buckle 136 and its threaded attachment to the second shackle 134. This is the manual leveling means from front to back, allowing the user to adjust the level of the rotatable tree stand 2 by tightening or loosening the turn buckle 136 to achieve the desired level from front to back.

FIG. 6 shows the electrically driven first cable 160, pulley system 184 and seat 128. This embodiment is a motorized rotatable, controllable, tree stand 2. The rotatable tree stand 2 comprises in combination; a tree hanger 4. The tree hanger 4 comprises two, spaced-apart, parallel to each other, vertical posts 10 and 12.

The first vertical post 10 has a front 186, a back 16, side surfaces 14, a mid-section 188, a distal end 190 and a near end 192.

The second vertical post 12 has a front 194, a back 20, side surfaces 18, a mid-section 196, a distal end 198 and a near end 200.

The distal ends 190 and 198 of each vertical post 10 and 12 have a cross members 202, fixedly attached to the backs 16 and 20 thereof.

The distal ends 190 and 198 of each vertical post 10 and 12 have an end of a first tree spike 36 fixedly attached to the respective side surfaces 16 and 20 of each vertical post 10 and 12.

The near ends 192 and 200 of each vertical post 10 and 12 have a cross 204 member fixedly attached thereto. The cross member 204 has a length that exceeds the total width of the vertical posts 10 and 12.

The near ends 192 and 200 of each vertical post 10 and 12 have a second set of tree spikes 208 fixedly attached to the respective side surfaces 14 and 18 of each vertical post 10 and 12.

There is a first rotatable roller bar 210 is rotatably mounted between the vertical posts 10 and 12. The first rotatable roller bar 210 has two terminal ends 216 and 218. There is also a first electric motor 220 attached to one first terminal end 216 thereof.

There is a second rotatable roller bar 212 is rotatably mounted between the vertical posts 10 and 12. This second rotatable roller bar 212 has two terminal ends 222 and 224, and second electric motor 226 attached to the first terminal end 222 thereof.

There is a third rotatable roller bar 214 rotatably mounted between the vertical posts 10 and 12. This third rotatable roller bar 214 has two terminal ends 228 and 230. Attached to the first terminal end 228 is the third electric motor 232.

The platform 92 has a size to support a person and has a tubular framework 162 comprising two side cross members 106, a front cross member 106, two back cross members 106 and a central supporting cross member 106, and the platform 92 has a vertical housing 126 fixedly attached to the central supporting cross member 106.

The housing 108 contains a second support post 110 and mounted on the second support post 110, a rotatable pulley 268'. The second support post 110 is freely rotatable in the housing 108. There is a seat 128 surmounting the seat support assembly 126.

The platform 92 has a plate 236 that is an attachment plate 236 surmounted on a portion of the platform frame 162 and is located near a front corner of the platform 92.

There is a cable 400 which is the right to left level cable for the electrically driven embodiment attached to the attachment plate 236. This embodiment has a cable 400 extending from the attachment plate 236 and extending to the second rotatable roller bar 212 around the roller bar 212 and then there is an opposing attachment to the attachment plate 236'.

There is a first cable 160 attached to one of the side bars 244 which extends to and around a first pulley 24, then to a second pulley 284', around a third pulley 234', under pulley 272, under pulley 274, over and around roller bar 214, under pulley 276, under pulley 272', around pulley 234, around pulley 280, around pulley 26, with attachment to side bar 116 of platform 92.

Third cable 248 is attached to a back bar 106 at the center thereof. This third cable 248 extends to and around a first rotatable roller bar 210 between the vertical posts 10 and 12.

When the electric motor 232 is engaged it operates the roller 213. If reverse is chosen the rotatable tree stand 2 moves to the right, if forward is chosen the rotatable tree stand moves to the left. The tree stand will rotate 360° if desired.

There is a second cable 400 attached to a first side bar 244 and opposite side bar 246 and around roller bar 212. Operating the motor 226 in a forward movement of the roller bar 212 will raise the platform 92. Operating the motor 226 in reverse will lower the platform 92. The side 402 moves in the opposite direction of the side 404. If side 404 goes up side 402 is lowered the vice versa. This is the leveling aspect of the electrically driven embodiment.

The third cable 248 is wrapped around the roller 210 and attached to the plate 236. The forward movement of the electric motor 220 will raise the front 96 of the platform 92. The opposite is true if the motor 220 is operated in reverse the front 96 of the platform 92 will lower. This is the leveling aspect of the platform from front to back.

This embodiment has mounted on the platform a battery 258 to drive the electric motors 220, 226 and 232 of the rotatable tree stand 2. It also carries a set of controls 260, 262, 264 and 266 for the electric motors 220, 226 and 232 mounted in the seat 128. The tree stand 2 also has a second supporting post 110 that is mounted on a ball joint 268.

The tree stand 2 of this embodiment also has a covering 104. It should be noted that the covering 104 (FIGS. 2 and 3) consists of any material suitable as a covering for the platform 192. This embodiment of the tree stand 2 has a cover 104 that is slotted. The cover 104 could also be mesh, plate steel or aluminum, wood, plastic or any other material suitable for the purpose of covering the platform 92.

FIG. 7 shows the expanded view of a motor 220, drive shaft 278 and the first roller 210. The motor 220 is electrically driven, which drives the roller 210 in a forward and a reverse direction which controls the movement of each specific cable. The first motor controls 260 control the up and down level by raising or lowering the front 96 end of the rotatable tree stand 2. The second motor controls 262 control the levels the platform 92 from right to left. The third motor controls 264 control the rotation of the seat in a 360° of rotation. In this embodiment the switches or controls 282, 284, 286 and 288 (shown in FIG. 6 in the seat) for the controls 260, 262, 264 and 268 are mounted in the front portion of the seat. Other embodiment includes a wireless remote control. Another embodiment includes a wired remote control.

Figure 8:
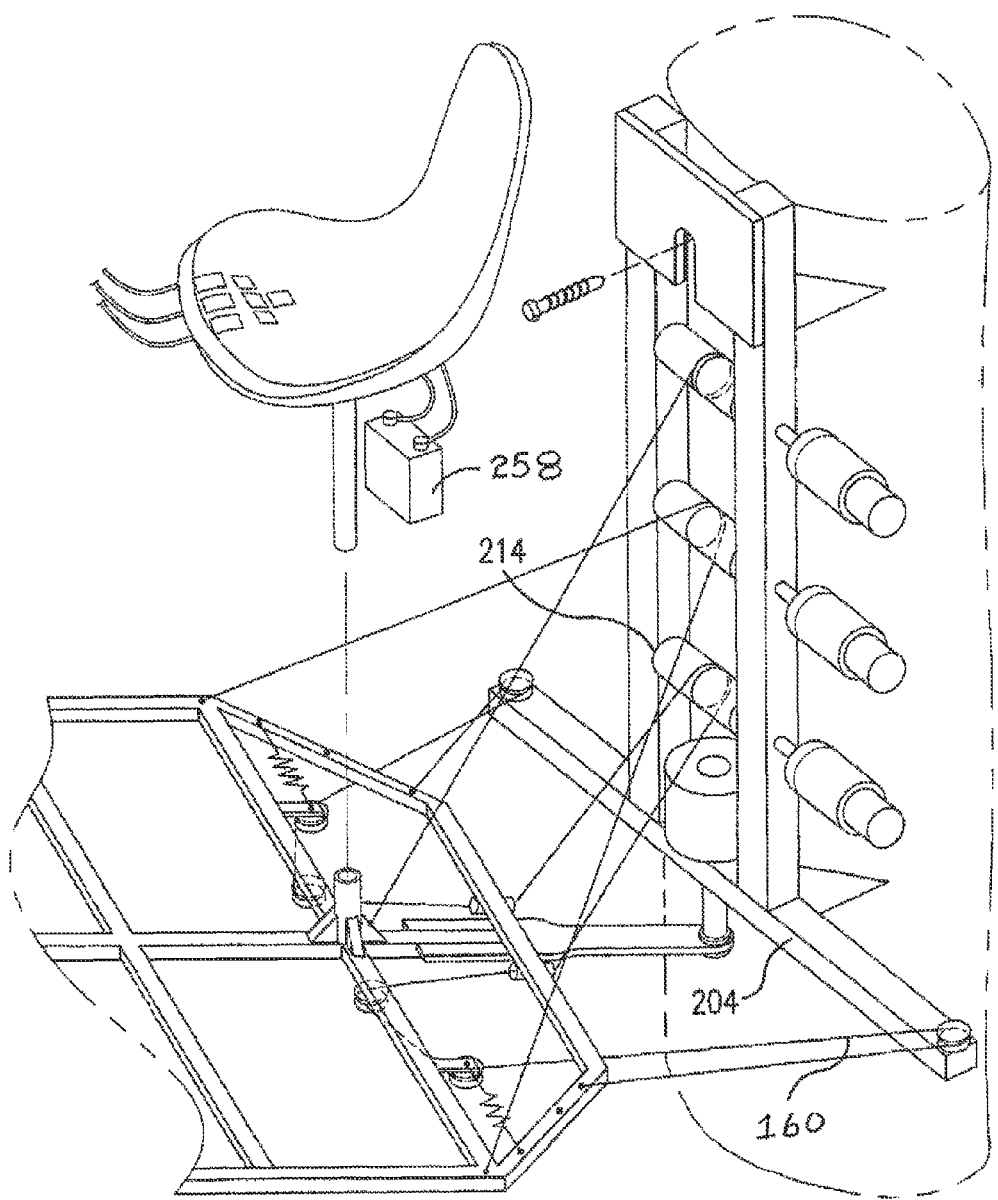
FIG. 8 shows the cable on the first roller as a one unitary continuous cable.

FIG. 8 shows the first cable 160 on the third rotatable bar 214 as a one unitary continuous cable.

What is claimed is:

1. A motorized, controllable, tree stand, said tree stand comprising in combination:
    a tree hanger, said tree hanger comprising two, spaced-apart, parallel to each other, vertical posts;
    each vertical post having a front, a back, side surfaces, a mid-section, a distal end and a near end;
    said distal ends of each vertical post having a cross member fixedly attached to the back thereof;
    said distal ends of each vertical post having an end of a first tree spike fixedly attached to the respective back surfaces of each vertical post;
    said near ends of each vertical post having a cross member fixedly attached to the bottom thereof, said cross member length exceeding the total width of the vertical posts;
    said near ends of each vertical post having an end of a second tree spike fixedly attached to the respective back surfaces of each vertical post;
    a first rotatable roller bar mounted between the vertical posts, said first rotatable roller bar having two terminal ends, an electric motor attached to one said terminal end thereof;
    a second rotatable roller bar mounted between the vertical posts, said second rotatable roller bar having two terminal ends, an electric motor attached to one said terminal end thereof;
    a third rotatable roller bar mounted between the vertical posts, said third rotatable roller bar having two terminal ends, an electric motor attached to one said terminal end thereof;
    a platform frame, said platform frame having a size to support a person and having a tubular framework comprising two side bars, a front bar, two back bars and a central supporting bar, and said platform having a vertical housing fixedly attached to said central supporting bar;
    said vertical housing containing a seat post and surmounted on said seat post, a seat support assembly, said seat post being freely rotatable in said vertical housing, there being a seat surmounting said seat support assembly;
    there being an attachment plate surmounted on a portion of the platform frame, and near a front corner thereof;
    a third cable attached to said attachment plate, said third cable extending from said attachment plate and extending to said first rotatable roller bar;
    a second cable attached to one said side bar, extending over said second rotatable roller bar, and extending to the opposite said side bar;
    a first cable attached to a back bar, said first cable extending to and around a third rotatable roller pulley surmounted on said cross member that is attached to said near ends of said vertical posts.

2. The tree stand as claimed in claim 1, wherein, in addition, there is a battery mounted on the platform frame.

3. The tree stand as claimed in claim 1 wherein, in addition, there are controls for the electric motors mounted in the seat.

4. The tree stand as claimed in claim 1 wherein the platform frame has a cover.

5. The tree stand as claimed in claim 4 wherein the cover is slotted.

6. The tree stand as claimed in claim 4 wherein the cable around said third rotatable bar is a unitary continuous cable.

* * * * *